(12) United States Patent
Nellhaus et al.

(10) Patent No.: US 6,543,692 B1
(45) Date of Patent: Apr. 8, 2003

(54) SCHEMA FOR IDENTIFICATION OF SOLID FORM DRUGS

(76) Inventors: Gerhard Nellhaus, Kursana Residenzen Rabenkopfstrasse 2, Freiburg (DE), 79102; Richard E. Peterson, 537 Valley St., San Francisco, CA (US) 94131

( * ) Notice: Subject to any disclaimer, the term of this patent is extended or adjusted under 35 U.S.C. 154(b) by 71 days.

(21) Appl. No.: 09/652,528

(22) Filed: Aug. 31, 2000

Related U.S. Application Data

(60) Provisional application No. 60/152,288, filed on Sep. 3, 1999.

(51) Int. Cl.$^7$ ................................................. G06K 7/10
(52) U.S. Cl. ................................... 235/462.01; 235/375
(58) Field of Search ............... 235/375, 462.01–462.49, 235/472.01–472.03, 494, 383, 454; 53/55, 168, 498

(56) References Cited

U.S. PATENT DOCUMENTS

| | | | |
|---|---|---|---|
| 4,266,478 A | * | 5/1981 | Ackley .......................... 101/40 |
| 4,786,229 A | * | 11/1988 | Henderson ................... 414/786 |
| 4,815,767 A | | 3/1989 | Lambert |
| 4,818,850 A | * | 4/1989 | Gombrich et al. .......... 235/494 |
| 4,859,187 A | | 8/1989 | Peterson |
| 4,939,354 A | | 7/1990 | Priddy et al. |
| 4,945,429 A | * | 7/1990 | Munro et al. ................. 360/92 |
| 5,031,937 A | | 7/1991 | Nellhaus |
| 5,118,369 A | * | 6/1992 | Shamir .......................... 156/64 |
| 5,231,938 A | * | 8/1993 | Gore ........................... 110/346 |
| 5,452,468 A | | 9/1995 | Peterson |
| 5,482,008 A | * | 1/1996 | Stafford et al. ............. 119/174 |
| 5,502,944 A | * | 4/1996 | Kraft et al. ..................... 53/55 |
| 5,529,767 A | * | 6/1996 | Brox et al. ................. 424/10.2 |
| 5,671,282 A | * | 9/1997 | Wolff et al. .................... 380/25 |
| 5,845,264 A | | 12/1998 | Nellhaus |
| 5,992,742 A | | 11/1999 | Sullivan et al. |
| 6,282,353 B1 | * | 8/2001 | Clark ............................ 385/99 |

OTHER PUBLICATIONS

IBM Technical Disclosure Bulletin, NA85035883, Chip Identification Writing System, Mar. 1985.*
IBM Technical Disclosure Bulletin, NA8909110, Visual Identification Tool, Sep. 1989.*

* cited by examiner

Primary Examiner—Thien M. Le
(74) Attorney, Agent, or Firm—Richard Esty Peterson

(57) ABSTRACT

A bar code schema for identification of solid form drugs, such as pills, tablets, capsules and the like using a data matrix type symbology for compact coding that is easily deciphered in combination with a common visual symbol that is easily recognized, the schema incorporating a portable code reading pen.

11 Claims, 4 Drawing Sheets

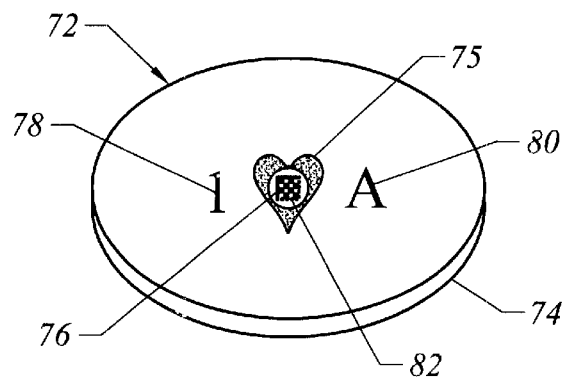
FIG. 10
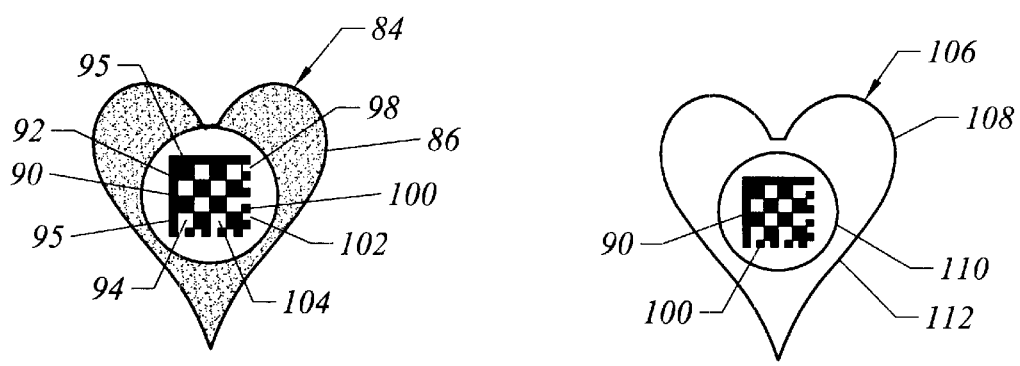
FIG. 11
FIG. 12

SCHEMA FOR IDENTIFICATION OF SOLID FORM DRUGS

This application claims the benefit of provisional application Ser. No. 60/152,288, filed Sep. 3, 1999.

BACKGROUND OF THE INVENTION

The identification schema for drugs proposed by this invention extends the concepts described in U.S. Pat. Nos. 5,031,937 and 5,845,264 of Dr. Gerhard Nellhaus and in particular the system for bar coding drug tablets, capsules, pills and the like for identification.

In selecting a bar code scheme for drugs, ease of reading both by machine and by visual inspection is an important criterion. A two dimensional bar code of the data matrix type is compact and can be easily scanned by an image capture device. Certain sweep scanners can read primitive data matrix type codes. However, the use of charged, coupled devices (CCD's) for images capture and software for image rotation and decoding makes the matrix pattern more practical for small objects.

SUMMARY OF THE INVENTION

For the application of identifying drugs, simplicity is desired. A 4×4 matrix is compact and lends itself to code in hexadecimal. Any standard reference can decode the hexadecimal to obtain alphanumeric characters Theoretically, a 4×4 matrix can code 65,536 items using a binary half-bite system.

However, orientation is a problem for a correct read of a matrix symbol, which may be a square mark at the center of a round pill. For most applications in drug marking, a 5×5 "adapted" matrix or a 6×6 matrix using Data Matrix™ alignment protocol is appropriate. For the very small pills a 4×4 matrix can be used with three of the corner squares having a common marking, i.e. black with the remaining square unmarked. This allows a definition of orientation, but reduces the date bits to 12 for itemizing only 4,096 objects.

Therefore, in the preferred bar code schema for imprinted drugs, that minimally satisfies the current FDA requirement for imprinting solid form drugs, a modified 4×4 matrix data field is used. To accommodate more than 4,096 objects, except for the reserve code for ultra small drugs, a 5×5 matrix is the preferred minimum.

Alternately, a matrix outline and a header bar for orientation can be used.

This results in a 6×4 matrix, since a space column should be incorporated between the data matrix and the header bar. Notably, the header bar could constitute the alphanumeric, advised, but not required by the FDA with little useful purpose other than orientation.

The 5×5 matrix, however, advantageously allows a solid header bar to be combined with an alternating checkerboard square pattern to both define the matrix size and allow for determination of granularity, which is an aid in reading. The granularity allows the size of the data bits to be determined.

As a last resort, the full protocol of the Data Matrix™ system can be implemented with a 6×6 matrix, although ironically this is too small to comply with the current ANSI Data Matrix™ standards which start with a 12×12 matrix.

Larger matrices are not required unless larger numbers of drugs are to be marked. Since marked information is desired to be informative, encryption codes are not required, thereby maximizing the data content in drug identification applications using a data matrix type protocol.

One solution to the competing interests of maximizing the visibility of the data squares within a data matrix orientation and granularity frame, and minimizing the overall size of the matrix is provided by doubling the size of the data squares in comparison with the squares forming the frame. In this manner, a 4×4 matrix of double size data squares in a frame of unitary size squares forms an effective 10×10 matrix. A 5×5 matrix of double size data squares with an orientation and granularity frame of unitary size squares effectively forms a 12×12 matrix, coincidentally the minimum matrix for an ANSI Data Matrix™ symbol. It is to be understood, however, that the error correction and validation coding within the matrix of a Data Matrix™ symbol are not employed. In the hybrid Data Matrix™ system disclosed, the increased size of the data squares substantially improves the likelihood of an accurate reading, and, more than off-sets the loss of error correction coding within the data field.

It is preferred that the matrix of the data matrix imprint be contained within a perimeter graphic that is useful for visual determination or differentiation of the drug by the patient. This graphic may be used in combination with other alphanumeric or symbolic marks, or with the pill shape or color for visual identification. The preferred graphic ideograph or icon should be easily recognizable for categorical identification. Additionally, the ideograph or icon should be of a type that can be easily communicated orally, for example, from one person to another by telephone, to aid in determining the pill's identity.

Upon implementation of the coding schema, a code reader pen is used for automatic identification of the drug item without resorting to tables and directories. The code reader pen is a self contained instrument similar in operation to a push-top, ball point pen with a light source, and a data retrieval lens that focuses the code imprint on a charged, coupled device (CCD) to capture a readable image. The pen includes a small processor and memory to decode the pattern, for example, by rotation and pattern matching against a set of stored templates or patterns. A database listing of drug names, for example, is displayed in an elongated display along the side of the pen which the user reads, like a thermometer, when making an identification using the code reader pen.

BRIEF DESCRIPTION OF THE DRAWINGS

FIG. 10 is a top view of a typical pill in the form of an oval tablet.

FIG. 11 is an enlarged view of a typical combination marking of an icon and matrix from FIG. 9.

FIG. 12 is an enlarged view of an alternate style of icon in the combination marking of the type shown in FIG. 11.

DETAILED DESCRIPTION OF THE PREFERRED EMBODIMENTS

Figure 1:
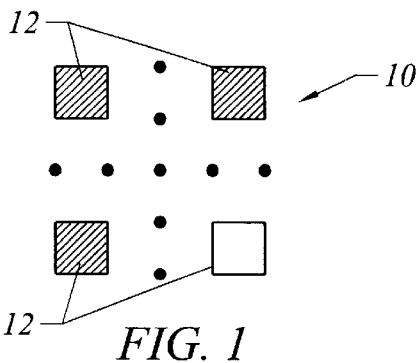
FIG. 1 is a bar code in the form or a 4×4 matrix with the corner square marked for orientation.

Referring to the drawings, a preferred bar code system for the application as a solid form drug identifier is shown in FIG. 1 as a 4×4 matrix 10. It is to be understood that in the following disclosure the code matrix is printed on the drug using standard drug imprinting machinery, for example, an inkjet or roll type printer. It is to be understood that alternate means of imprinting the drug code on the drug can be accomplished. For example, the pill, capsule or tablet can be scored, embossed or pitted in a manner that can be read by a reading device using reflected and/or diffracted light or other means such as ultrasonic waves. However, the use of a simple printing system that prints black ink in a "checker board" type matrix is expedient for implementing this invention.

In the 4×4 matrix 10 of FIG. 1, the four corner squares 12 must be reserved to indicate the orientation of the matrix 10 since the matrix may be placed on the center of a circular pill. By utilizing the four corner squares 12 the data content is reduced to identifying 4,096 items, which is insufficient for the number of available drugs. However, this small matrix can be reserved for those very small pills in which a larger matrix would be inappropriate.

Figure 2:
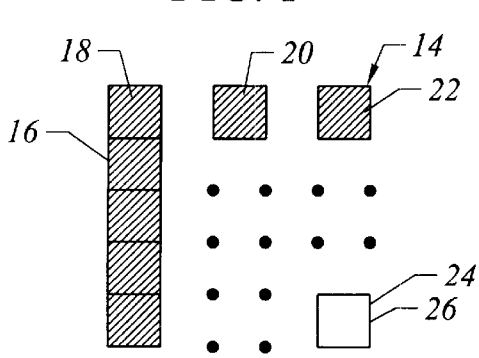
FIG. 2 is a bar code in the form of a 5×5 matrix with an alignment column and granularity row.

Referring to FIG. 2, a 5×5 matrix 14 is shown that complies in principal with Data Matrix™ symbology in that an orientation bar 16, indicated as the first column 18 in the matrix, and a granularity bar 20, indicated as the first row 22 in the matrix, can provide for information about both the orientation of the matrix and the granularity of the data bits that are indicated as discrete squares 24 that are either black or white (or background color). Because the fourth corner square 26 should remain uncolored to allow for orientation, the data content is sufficient for coding 32,768 items.

Figure 3:
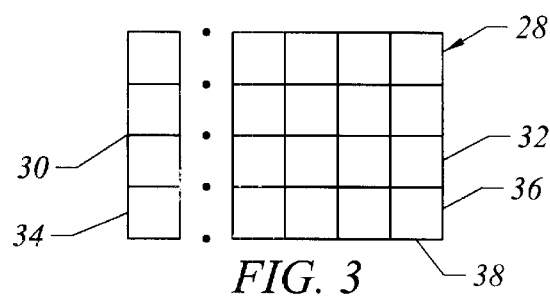
FIG. 3 is a bar code in the form of a 6×4 rectangular matrix with a header bar for alignment.

FIG. 3 is an alternate rectangular arrangement 28 in which an alignment bar 30 or header is provided proximate to a data field 32. In this embodiment it is expected that both the squares 34 of the alignment bar 30 and the squares 36 of the data field 34 delineated with lines 38 by the printing process. In this manner, the code outline can be identified and the fields can be supplied with printed squares for coding. Preferably, the header bar 30 is oriented under the data field when reading or interpreting the code as in the convention for underlining "6" and "9" for defining orientation.

Figure 4:
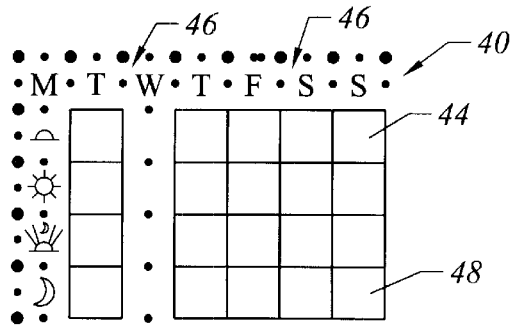
FIG. 4 is a 5×7 field, incidentally used for drug image display.
Figure 5:
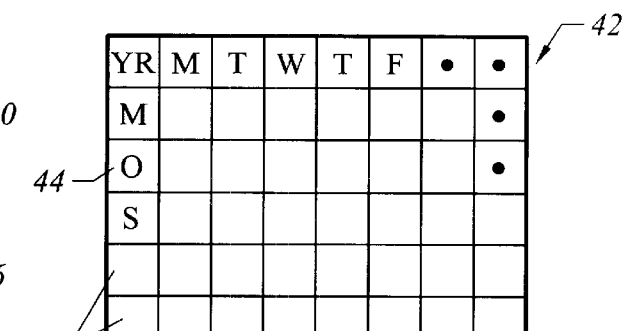
FIG. 5 is a 6×8 field, incidentally used for calendars, including drug image display.

FIGS. 4 and 5 are ancillary to this invention and disclose the manner in which displays for calendaring or scheduling the taking of drugs can be divided into a matrix 44 that can also serve as a coded device for carrying coding of the data field that is implemented by a printer when printing the encoded data field on a drug item. For example, these scheduling templates can be designed with reserved fields for one or more embedded data matrices in the headings 46 in the form of small, barely visible, graphics that identify and link to tablet or capsule images for pictorial display of the actual pill images in scheduling squares 48 of the matrix. These graphics can be read with the reader pen as a cross check for pill identification, since the pictorial pill image that is printed on the schedule will likely be of a quality that the data matrix marking on the pill image cannot be accurately read when using an ordinary color ink jet printer or the like to print the schedule.

Figure 6:
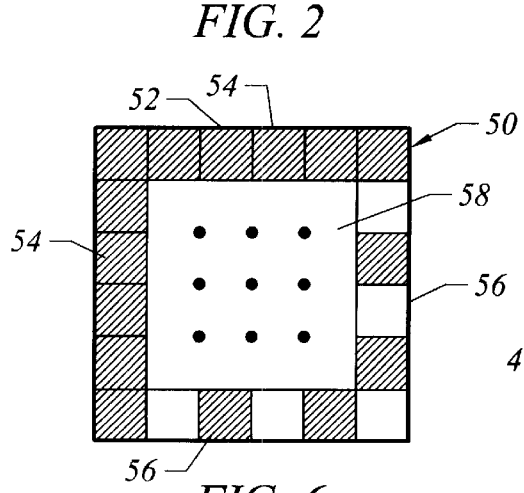
FIG. 6 is a bar code in the form or a 6×6 Data Matrix™ format with a 4×4 data field.

FIG. 6 is a 6×6 matrix 50 that has a frame 52 with two contiguous solid orientation bars 54 and two contiguous granularity bars 56 of alternating squares of different contrast, for example, black and white squares. The frame 52 forms a perimeter around a data matrix 58 and permits full use of the 65,536 item identifications available in a 4×4 matrix.

Figure 7:
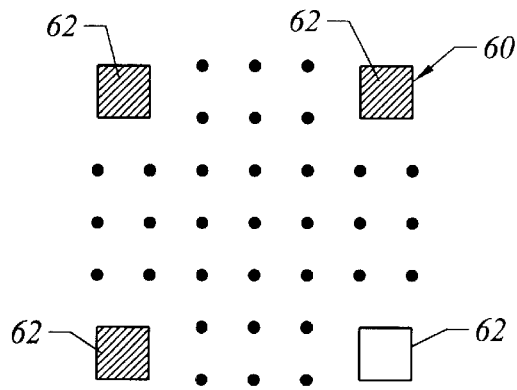
FIG. 7 is a bar code in the form of a 6×6 matrix using corner squares for orientation.

FIG. 7 is a 6×6 matrix 60 with the corner squares 62 reserved for marking the orientation of the matrix when read. Since the 6×6 matrix has available thirty two remaining squares for data encoding, over 4 billion items can be encoded.

Figure 8:
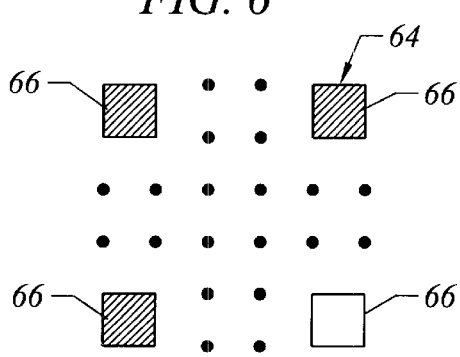
FIG. 8 is a bar code in the form of a 5×5 matrix using corner squares for orientation.

FIG. 8 is a 5×5 matrix 64 with the 4 corner squares 66 reserved for orientation of the matrix with twenty one remaining squares for data content allowing for over 2 million items to be identified.

Figure 9:
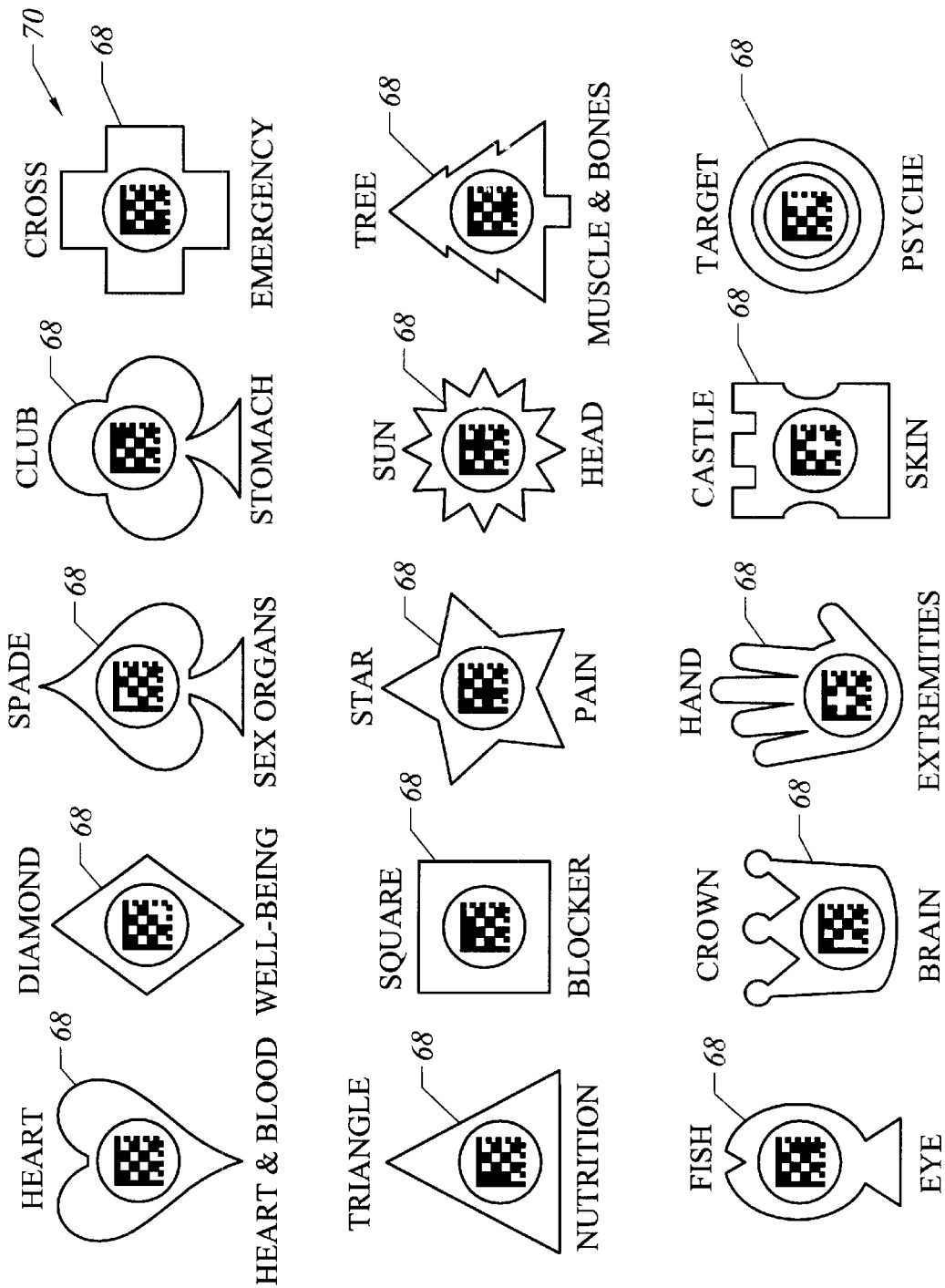
FIG. 9 is a set of icons, or ideographs, that are suitable for easy recognition in outline form.

Since it is expected that generic drugs will be the first drugs marked with an imprint code that is machine readable, it is preferred that the imprint code be accompanied by a standard graphic symbol that is human readable without regard to language, such as one of the symbols or icons 68 depicted in the emblem chart 70 of FIG. 9. In the emblem examples of FIG. 9, the preferred hybrid Data Matrix™ symbology described with reference to FIGS. 11 and 12 is utilized.

Referring to FIG. 10, a typical drug item 72, such as the oval pill 74 on which is marked with a heart icon 75, would advantageously include the matrix code 76 within the center of the outline of the well recognized symbol. In addition, a number 78 and/or a letter 80 can accompany the graphic symbol 75 and the data matrix 82 to enable a patient or handler of the pill to readily identify the pill using easily described symbology. For example, in an emergency a patient can by telephone indicate that the pill in question is an oval pill of pale orange color with a heart and the alphanumeric indicia of "1 and A" marked on the pill. Notably, this additional symbology and alphanumeric marking is not required by the FDA to comply with the FDA imprinting regulations. The symbology in the form of a readily recognizable icon is preferably suggestive of the category or drug or type of ailment treated. Even without the addition of an alphanumeric marking, it is believed that such common, easily identified symbology, would be a great aid and a useful addition to bar coding for the purpose of drug identification. Where possible, it is desired that the data matrix 82 be centered in the ideograph or icon 75 wherein the icon forms a target for locating the matrix code. Where printing degenerates, for example, on imprinting a very small matrix on very small pills, the data matrix 82 can be printed on one side of the pill and the icon 75 on the other.

In adopting a particular bar code arrangement, a conventional bar code can be utilized. However, for economy of size and readability, a data matrix type of bar coding system is preferred. While a number of different alternatives for encoding have been proposed, the actual system that is considered best for adoption is disclosed with reference to FIGS. 11 and 12. Ultimately, the bar code format adopted should be decided with the involvement of both the drug manufacturers and distributors, and the standards organizations. It is to be understood that the ANSI standards for bar code symbology do not include the smaller matrices that are here proposed. However, since readability is desired and the ability to decode a marking, even without a machine reading device is preferred, the simplest system with the fewest squares is considered the best.

In a preferred embodiment, a hybrid code symbology that approximates the standard Data Matrix™ symbology is described with reference to FIGS. 11 and 12. This would allow use of devices that have been designed for recognition of standard ANSI Data Matrix™ symbologies with little modification. The hybrid Data Matrix™ system devised, incorporates an alignment and granularity frame that complies with the ANSI standards, but incorporates a data field using squares that are twice as large as the granularity squares in the symbol.

Referring to FIG. 11, the result is shown for a combination symbol 84 including a graphic symbol 86 in the form of a heart that forms a border around a quiet zone 88 in the form of a circle around the hybrid Data Matrix™ symbol 90. The Data Matrix™ symbol 90 includes a frame 92 around a data field 95. The frame 92 comprises a perimeter alignment pattern that comprises two contiguous solid bars 94 of dark squares 96 and two granularity bars 98 formed of alternating patterns of dark squares 100 and light squares 102. In this manner, the orientation of the symbol to be decoded can be determined, and the granularity of the data in the data field is defined. However, in the hybrid system the data field 94 includes double sized squares 104 for ease of printability and readability. Effective error correction can be accomplished by determining whether any of the squares in the granularity portions of the frame are missing. If a correct read of the granularity squares cannot be obtained, then great caution should be used in reading the double sized squares of the data field. It is highly unlikely the double sized squares of the data field will be damaged beyond recognition give the comparative size of the squares which can be visually examined for damage and visually decoded if necessary.

If the size of the data field is maintained at a 4×4 matrix, then added protection can be obtained by following the rules for a data field without a frame or perimeter pattern. If this is done as a safety measure for the most critical of solid form drugs, then the remaining pharmaceuticals can be identified using a data field having a 5×5 matrix. Notably, when using a 5×5 matrix, the effective size of the hybrid data matrix symbol is a 12×12 matrix. Furthermore, where the identification of the solid form capsule or tablet is not critical, as in the unregulated area of dietary supplements, then a 6×6 matrix resulting in a hybrid Data Matrix™ symbol with an effective 14×14 matrix can be utilized.

In FIG. 11 the graphic symbol 86 in the composite marking is shown in a solid form. In general, this minimizes the size of the symbol and maximizes the readability of the encompassed hybrid Data Matrix™ symbol 90. However, if it is desired, the graphic symbol can be in line form as shown in FIG. 12.

In FIG. 12, the combination visual readable and machine readable symbol 106 includes the visual symbol 108 in outline form, a target circle 110 that encompasses the hybrid Data Matrix™ symbol 90 at the center of the circle 110. Notably the thickness of the printed line 112 in the combination symbol 106 of FIG. 12 is equivalent to the dimension of a granularity square 100 in the hybrid Data Matrix™ symbol 90.

It is to be understood that the emblems shown in FIG. 9 are merely examples of readily identifiable ideographs that can be used for categorizing drugs. More traditional icons that are used in medicine for identifying categories of drug substances can be employed. These icons are often pictographs such as the outline of a head, stomach, or other anatomical part affected by the drug. The "hand" icon in the emblem chart of FIG. 9 would be of this type.

Figure 13:
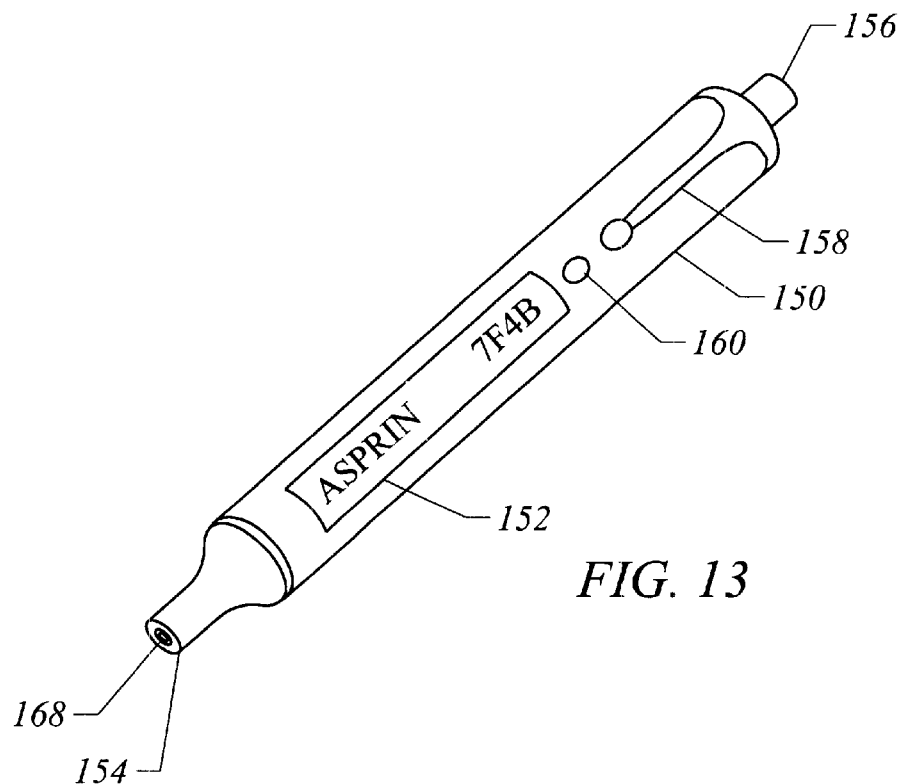
FIG. 13 is a perspective view of a code reading pen.

In order to conveniently read the imprint code, a code reading device 148 is provided for use by the physician, pharmacist, patient or other user. The device 148 is preferably in the form of a pen as shown in FIG. 13 with a body or housing 150 and a side display 152 with a reading tip 154 and an activating button 156. The pen can include a clip 158 for the convenience of the user and preferably has a light 160 to indicate whether a correct read has been made. In use, the physician simply points the tip 154 at the code matrix on the drug item and presses the button 156 at the end of the code reading pen. If a correct read is effected, the light 160 lights and the display 152 displays the item identification, here ASPIRIN, and preferably the interpreted bar code read, which is shown as the hexadecimal reference 7F4B.

Figure 14:
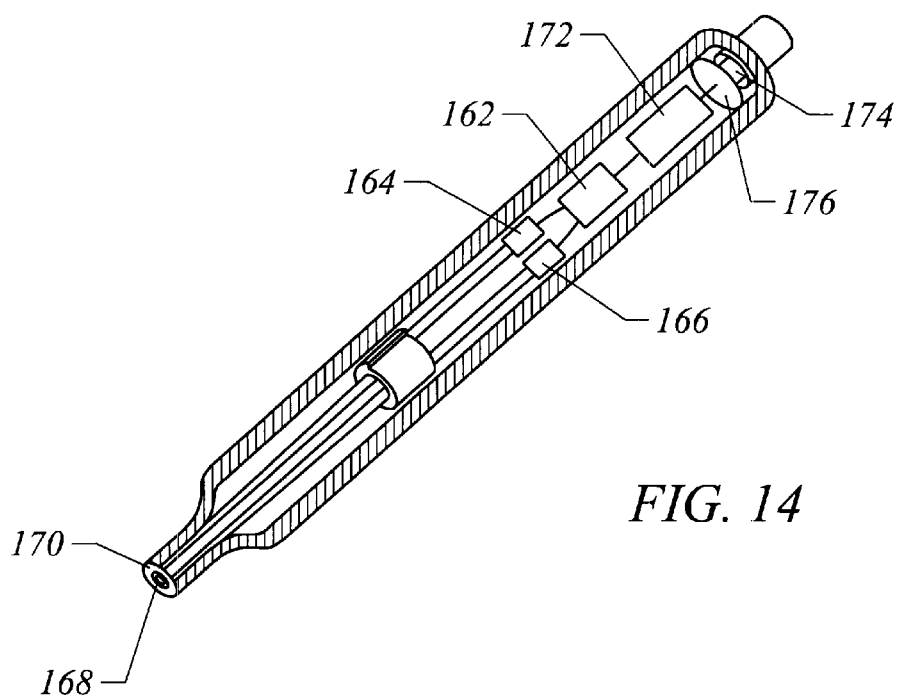
FIG. 14 is a cross-sectional view of the code reading pen of FIG. 13.

As shown in FIG. 14, the pen operates by having an internal processor 162 that controls a light source 164 and a read device such as a charged, coupled device (CCD) 166 that receives an image of the matrix through an optic rod 168 in the end of the pen 154. Around the optic rod 168 is a concentric light tube 170 that provides an illumination to assist in the reading process. The end of the combined rod and tube may be machined in the form of a suitable lens. Depressing the button 156 activates a switch 174 connected to a power source such as a battery 176 to initiate the read procedure. The matrix image received by the charged, coupled device 166 is processed by the processor 162. Customarily, the processed image is rotated, using software algorithms, to match one of the template images in memory which is interpreted as a hexadecimal code that is compared with a record listing of drug item identifications in a memory 172. The processor 162 causes the matched drug item identification to be displayed in the display 152. It is to be understood that the code reading pen 148 can be connected to a conventional personal computer with a cable or wirelessly for further processing of the data received, for example by accessing a data base for further description of the identified drug, including a pictorial image of the drug.

It is understood that other conventional 1D and 2D bar coding symbologies can be used to implement the imprinting of drugs with a bar code and an icon that are useful for identification and for the other procedures in manufacturing and distributing drugs that are assisted by bar code systems. The imprint system is implemented by means of a drug registry where manufacturers and/or distributors can apply for a unique imprint mark for the identification of their solid form drug.

While, in the foregoing, embodiments of the present invention have been set a forth in considerable detail for the purposes of making a complete disclosure of the invention, it may be apparent to those of skill in the art that numerous changes may be made in such detail without departing from the spirit and principles of the invention.

What is claimed is:

1. A drug identification system for marking solid form drugs comprising a pill imprint having a first marking in the form of a human recognizable symbolic icon and a second marking in the form of a machine readable bar code, wherein the human recognizable symbolic icon provides a general identification suitable for categorical identification and communication, and the machine readable bar code provides an item identification.

2. The drug identification system of claim 1 wherein the marking is a composite marking that combines the first icon marking and the second bar code marking into a composite symbol.

3. The drug identification system of claim 2 wherein the symbolic icon marking provides a target for the bar code marking.

4. The drug identification system of claim 3 wherein the bar code is a 2D bar code.

5. The drug identification system of claim 4 wherein the 2D bar code is a data matrix type bar code.

6. The drug identification system of claim 4 wherein the 2D bar code is a matrix of squares with corner orientation squares and remaining data squares.

7. The drug identification system of claim 4 wherein the 2D bar code is a hybrid data matrix code with a data field and an orientation and granularity frame around the perimeter of the data field, wherein the frame and field are comprised of squares having a dimension and the squares of the data field have a dimension twice the dimension of the squares of the frame.

8. The drug identification system of claim 1 in combination with a portable bar code reader pen having a drug identification display for displaying drug item identifications responsive to a bar code read.

9. The portable bar code reader of claim 8 wherein the reader is in the form of a pen and the bar code is in the form of a 2D bar code.

10. The drug identification system of claim 1 in combination with a database with pictorial images of drugs wherein a select bar code identifies a particular drug and is linked to the pictorial image of the identified drug.

11. The drug identification system of claim 1 wherein the 2D bar code is a hybrid data matrix code with a data field and two contiguous orientation bars around two sides of the perimeter of the data field, wherein the orientation bars are comprised of like kind squares having a dimension and the squares of the data field have a dimension twice the dimension of the squares of the frame.

* * * * *